United States Patent
Deng et al.

(10) Patent No.: US 10,085,078 B2
(45) Date of Patent: Sep. 25, 2018

(54) DATA PROCESSING METHOD, RELATED DEVICE, AND SYSTEM FOR OPTICAL TRANSPORT NETWORK

(71) Applicant: HUAWEI TECHNOLOGIES CO., LTD., Shenzhen, Guangdong (CN)

(72) Inventors: Ning Deng, Shenzhen (CN); Maarten P. J. Vissers, Amsterdam (NL); Xiaozhong Shi, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 14/541,950

(22) Filed: Nov. 14, 2014

(65) Prior Publication Data

US 2015/0071637 A1 Mar. 12, 2015

Related U.S. Application Data

(63) Continuation of application No. PCT/CN2012/075513, filed on May 15, 2012.

(51) Int. Cl.
*H04Q 11/00* (2006.01)
*H04J 3/16* (2006.01)

(52) U.S. Cl.
CPC ........ *H04Q 11/0071* (2013.01); *H04J 3/1658* (2013.01); *H04Q 11/0066* (2013.01);
(Continued)

(58) Field of Classification Search
CPC ................. H04Q 2011/0086; H04J 3/1658
(Continued)

(56) References Cited

U.S. PATENT DOCUMENTS 7,535,837 B2   5/2009 Wolf et al.
2002/0149820 A1* 10/2002 Liu .................... H04Q 11/0066
                                                                  398/98
(Continued)

FOREIGN PATENT DOCUMENTS

CN   101155120   4/2008
CN   101621714   1/2010
(Continued)

OTHER PUBLICATIONS

Extended European Search Report dated Aug. 17, 2015 in corresponding European Patent Application No. 12759883.7.
(Continued)

*Primary Examiner* — David Payne
*Assistant Examiner* — Omar S Ismail
(74) *Attorney, Agent, or Firm* — Staas & Halsey LLP

(57) ABSTRACT

Embodiments of the present invention provide a data processing method, related device, and system for an optical transport network. The data processing method for the optical transport network includes: encapsulating service data into an optical payload unit; mapping the optical payload unit to an optical channel data unit; mapping the optical channel data unit to a payload area of an optical burst transport unit; performing electrical-optical conversion on the optical burst transport unit to form an optical burst transport unit; carrying the optical burst transport unit onto an optical timeslot of an optical burst channel; and transmitting the optical burst channel to a line. Technical solutions provided by the present invention can effectively simplify a data processing process and reduce a data processing delay.

7 Claims, 6 Drawing Sheets

(52) U.S. Cl.
CPC ............... *H04J 2203/0085* (2013.01); *H04Q 2011/0086* (2013.01)

(58) Field of Classification Search
USPC .......................................................... 398/52
See application file for complete search history.

(56) References Cited

U.S. PATENT DOCUMENTS

| | | | | |
|---|---|---|---|---|
| 2007/0189336 A1* | 8/2007 | Zou | ............... | H04J 3/07 370/505 |
| 2008/0095535 A1* | 4/2008 | Zou | ............... | H04Q 11/0067 398/58 |
| 2009/0010650 A1* | 1/2009 | Tsuchiya | ............... | H04J 3/0602 398/59 |
| 2009/0208208 A1* | 8/2009 | Chen | ............... | H04J 3/1658 398/45 |
| 2009/0313465 A1* | 12/2009 | Verma | ............... | H04L 63/0428 713/153 |
| 2011/0097090 A1 | 4/2011 | Cao | | |
| 2013/0011142 A1* | 1/2013 | Goodson | ............... | H04Q 11/0067 398/98 |

FOREIGN PATENT DOCUMENTS

| | | |
|---|---|---|
| CN | 101677416 | 3/2010 |
| CN | 101959083 | 1/2011 |
| EP | 1361776 A1 | 11/2003 |
| EP | 1507437 A1 | 2/2005 |
| EP | 2139262 A1 | 12/2009 |
| WO | 02/071791 A2 | 9/2002 |

OTHER PUBLICATIONS

Grieco et al., "Fractional Lambda Switching for Flexible Bandwidth Provisioning in WDM Networks: Principles and Performance", Photonic Network Communications, 9:3, 2005, pp. 281-296.
PCT International Search Report dated Feb. 28, 2013 in corresponding International Patent Application No. PCT/CN2012/075513.
Chinese Office Action dated Aug. 5, 2014 in corresponding Chinese Patent Application No. 201280000554.0.
"Series G: Transmission Systems and Media, Digital Systems and Networks, Digital terminal equipments—General Series Y: Global Information Infrastructure, Internet Protocol Aspects and Next-Generation Networks, Internet protocol aspects—Transport, Interfaces for the optical transport network", ITU-T, G.709/Y.1331, Feb. 2012, 238 pp.

* cited by examiner

DATA PROCESSING METHOD, RELATED DEVICE, AND SYSTEM FOR OPTICAL TRANSPORT NETWORK

CROSS-REFERENCE TO RELATED APPLICATIONS

This application is a continuation of International Application No. PCT/CN2012/075513, filed on May 15 2012, which is hereby incorporated by reference in its entirety.

TECHNICAL FIELD

Embodiments of the present invention relate to the field of optical communications, and in particular, to a data processing method, related device, and system for an optical transport network.

BACKGROUND

An optical transport network (OTN) is a transport network based on a wavelength-division multiplexing technology and networking at an optical layer, and is a mainstream transport network technology at present. Due to explosive increase of Internet Protocol (IP, Internet Protocol) services transported on a network and other data services based on packet transport, requirements on a transmission capacity increase rapidly and continuously. With maturity and application of a dense wavelength division multiplexing (DWDM, Dense Wavelength Division Multiplexing) technology and an optical amplifier (OA, Optical Amplifier) technology, a transport network is evolving into an optical transport network based on an optical networking technology. The emergence of a transport network based on the OTN gradually turns an intelligent optical network expected by people into reality and provides network operators and customers with a secure, reliable, cost-effective, customer-irrelevant, manageable, operable, and efficient new-generation optical transport platform. On the OTN, service data is first encapsulated into an optical payload unit (OPU, Optical Payload Unit) by using a certain encapsulation method, then mapped to an optical channel data unit (ODU, Optical channel Data Unit), and then mapped to an optical transport unit (OTU, Optical Transport Unit). After electrical-optical conversion, a network hierarchy of the optical layer sequentially includes an optical channel layer, an optical multiplexing section layer, and an optical transport section layer. According to rates of the ODU, the ODU is mainly classified into types shown in table 1.

TABLE 1

| Signal | Data rate (unit: Gigabit per second) |
| --- | --- |
| ODU0 | 1.24416 |
| ODU1 | 2.49877512605042 |
| ODU2 | 10.0372739240506 |
| ODU2e | 10.3995253164557 |
| ODU3 | 40.3192189830509 |
| ODU3e2 | 41.7859685595012 |
| ODU4 | 104.794445814978 |

On the OTN, a lower order ODU can be multiplexed into a higher order ODU. For example, when an ODU1 is compared with an ODU2, the ODU1 is a lower order ODU, and the ODU2 is a higher order ODU; and when the ODU2 is compared with an ODU3, the ODU2 is a lower order ODU, and the ODU3 is a higher order ODU. Therefore, before the ODU is mapped to the OTU in the foregoing description, it is possible that this ODU needs to be multiplexed as a lower order ODU into a higher order ODU.

An important feature of the OTN is that the OTN not only provides cross-connection and multiplexing (which can be performed by using a reconfigurable optical add-drop multiplexer (ROADM, Reconfigurable optical add-drop multiplexer) at present) of a wavelength-level optical channel, but also provides cross-connection and multiplexing at a sub-wavelength granularity ODU level.

Both the cross-connection and the multiplexing of the ODU are performed at an electrical layer by electrical signal processing. That is, to perform the cross-connection of the ODU, first, an optical signal needs to be converted into an electrical signal by using an optical receiver, and then the ODU is extracted from the electrical signal layer by layer; then electrical cross-connection is performed, then encapsulation is performed layer by layer, and then conversion to an optical signal is performed by using an optical transmitter. Evidently, an intermediate node of the OTN needs to perform optical-electrical-optical conversion on transmitted data and a great deal of electrical signal processing, a data processing process is complex, and a data processing delay is relatively great.

SUMMARY

Embodiments of the present invention provide a data processing method, related device, and system for an optical transport network, which are used for simplifying a data processing process and reducing a data processing delay.

According to a first aspect, a data processing method for an optical transport network is provided, including:
  encapsulating service data into an optical payload unit;
  mapping the optical payload unit to an optical channel data unit;
  mapping the optical channel data unit to a payload area of an optical burst transport unit;
  performing electrical-optical conversion on the optical burst transport unit to form an optical burst transport unit;
  carrying the optical burst transport unit onto an optical timeslot of an optical burst channel; and
  transmitting the optical burst channel to a line.

According to a second aspect, a data processing method for an optical transport network is provided, including:
  obtaining an optical burst channel carried on a line;
  performing optical-electrical conversion on an optical burst transport unit on the optical burst channel and obtaining an optical burst transport unit;
  demapping the optical burst transport unit to obtain an optical channel data unit from a payload area of the optical burst transport unit;
  demapping the optical channel data unit to obtain an optical payload unit; and
  decapsulating the optical payload unit to obtain service data.

According to a third aspect, a data transmitting processing apparatus is provided, including:
  an encapsulating unit, configured to encapsulate service data into an optical payload unit;
  a first mapping unit, configured to map the optical payload unit to an optical channel data unit;
  a second mapping unit, configured to map the optical channel data unit to a payload area of an optical burst transport unit;

an electrical-optical conversion module, configured to perform electrical-optical conversion on the optical burst transport unit to form an optical burst transport unit;

an optical burst mapping module, configured to carry the optical burst transport unit onto an optical timeslot of an optical burst channel; and a transmitting module, configured to transmit the optical burst channel to a line.

According to a fourth aspect, a data receiving processing apparatus is provided, including:

an obtaining unit, configured to obtain an optical burst channel carried on a line;

an optical-electrical conversion module, configured to perform optical-electrical conversion on an optical burst transport unit on the optical burst channel to obtain an optical burst transport unit;

a first demapping module, configured to demap the optical burst transport unit to obtain an optical channel data unit from a payload area of the optical burst transport unit;

a second demapping module, configured to demap the optical channel data unit to obtain an optical payload unit; and a decapsulating unit, configured to decapsulate the optical payload unit to obtain service data.

According to a fifth aspect, an optical transport network system is provided, including:

a data transmitting processing apparatus and a data receiving processing apparatus, where the data transmitting processing apparatus is configured to: encapsulate service data into an optical payload unit; map the optical payload unit to an optical channel data unit; map the optical channel data unit to a payload area of an optical burst transport unit; perform electrical-optical conversion on the optical burst transport unit to form an optical burst transport unit; carry the optical burst transport unit onto an optical timeslot of an optical burst channel; and transmit the optical burst channel to a line; and the data receiving processing apparatus is configured to: obtain an optical burst channel carried on a line; perform optical-electrical conversion on an optical burst transport unit on the optical burst channel and obtain an optical burst transport unit; demap the optical burst transport unit to obtain an optical channel data unit from a payload area of the optical burst transport unit; demap the optical channel data unit to obtain an optical payload unit; and decapsulate the optical payload unit to obtain service data.

As can be learned from the foregoing technical solutions, the embodiments of the present invention have the following merits.

The embodiments of the present invention provide that an optical channel data unit (ODU, Optical channel Data Unit) is mapped to an optical burst transport unit, and is mapped to an optical timeslot and an optical burst channel level by level, thereby making an optical burst timeslot switching network and a mature OTN network architecture compatible and unified. On the optical burst timeslot switching network, an optical signal is switched in an all-optical manner, that is, multiplexing and cross-connection processes of an optical burst channel are implemented at an optical layer, and therefore, multiplexing and cross-connection of the ODU can also be implemented at the optical layer, which saves a great deal of optical-electrical conversion, electrical-optical conversion, and electrical processing during a data transmission process. On one hand, a data processing process is simplified. On the other hand, a data processing delay is effectively reduced.

DESCRIPTION OF EMBODIMENTS

Embodiments of the present invention provide a data processing method, related device, and system for an optical transport network.

Optical burst switching or optical burst timeslot switching is a new all-optical switching technology at a sub-wavelength granularity. A core idea of the technology is to divide a wavelength into many optical timeslots of sub-wavelengths, encapsulate and map service data to each optical timeslot. At an intermediate node of a network, an optical signal is switched by using all-optical manners such as an all-optical switching array. Put simply, the all-optical switching array is an "optical switching chip". As a counterpart of an "electrical switching chip", the all-optical switching array can directly switch optical burst packets. By switching an optical signal by using the all-optical manners such as the all-optical switching array, optical-electrical-optical conversion and a great deal of electrical signal processing at the intermediate node are saved. A data processing manner on an optical burst timeslot switching network may be as follows: service data is first encapsulated by using a certain encapsulation manner and mapped to an optical burst transport unit (OBTU, Optical Burst Transport Unit); then, by performing electrical-optical conversion, the optical burst transport unit is mapped to an optical timeslot of an optical burst channel (OBCh, Optical Burst Channel) at an optical layer; then by multiplexing at the optical layer, the optical burst channel is multiplexed to an optical burst multiplex section (OBMS, Optical Burst Multiplex Section); and then the optical burst multiplex section is multiplexed to an optical multiplexing section (OMS, Optical Multiplexing Section) and an optical transport section (OTS, Optical Transport Section). It should be noted that the optical burst transport unit may be also referred to as an optical burst unit, which indicates that an optical burst channel corresponds to an electrical signal at an electrical layer. In the present invention, the "optical burst transport unit" is uniformly used for description.

Figure 1:
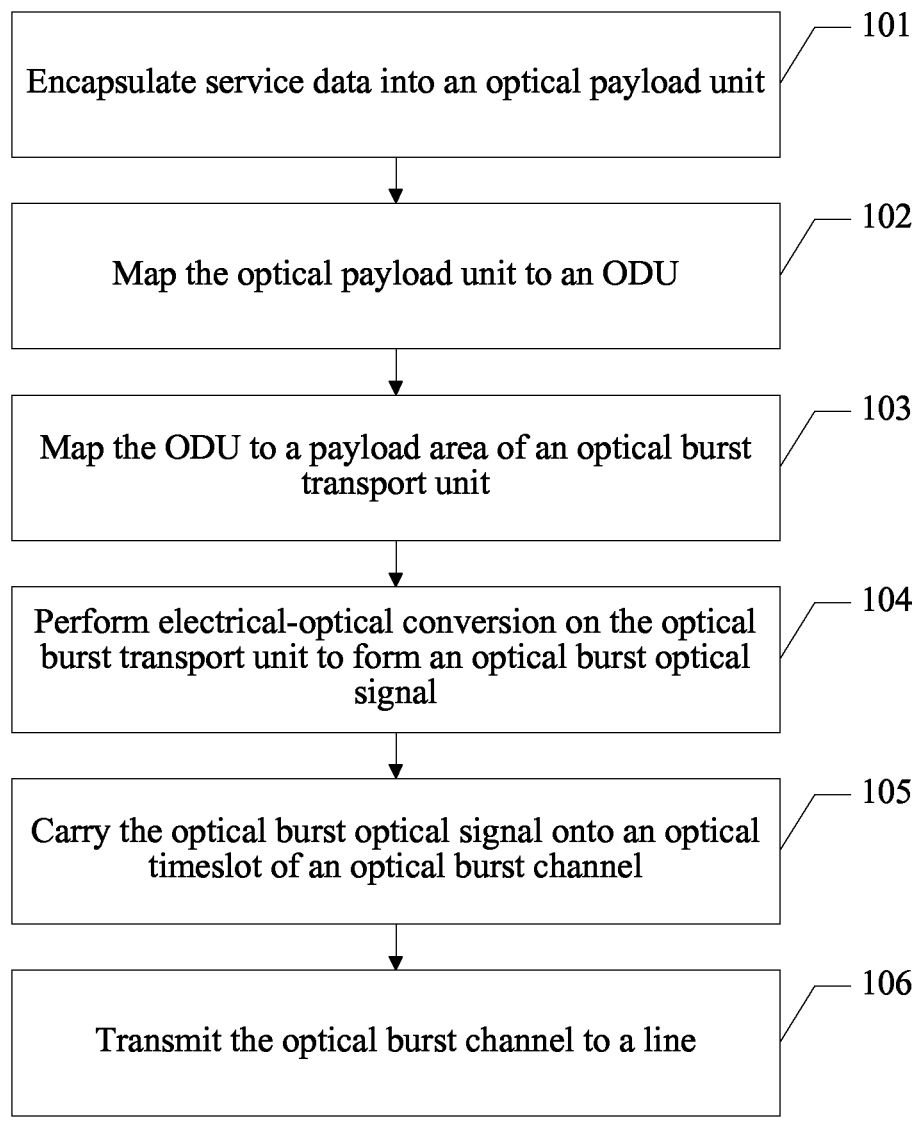
FIG. 1 is a schematic flowchart of an embodiment of a data processing method for an optical transport network according to the present invention.

The following describes a data processing method for an optical transport network in an embodiment of the present invention. Referring to FIG. 1, the data processing method for the optical transport network in the embodiment of the present invention includes:

101: Encapsulate service data into an optical payload unit.

A data transmitting processing apparatus encapsulates the service data into the optical payload unit (OPU, Optical Payload Unit). The service data may be, for example, Ethernet-type service signal data, Gigabit Ethernet service signal data, 10-Gigabit Ethernet service signal data, a synchronous transfer mode signal (such as STM-8 or STM-16), or the like, which is not limited herein.

102: Map the optical payload unit to an ODU.

103: Map the ODU to a payload area of an optical burst transport unit.

Figure 2:
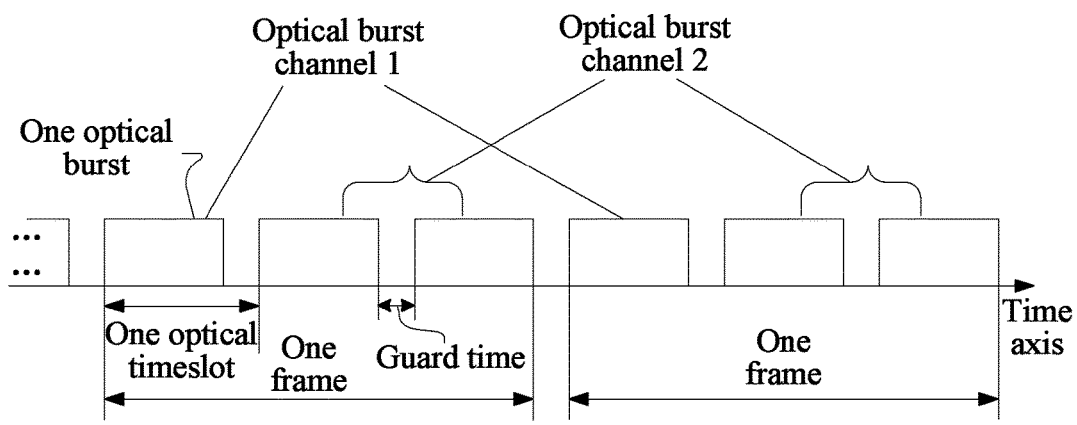
FIG. 2 is a schematic structural diagram of an optical burst transport unit of which each frame includes three optical bursts according to the present invention.

In this embodiment of the present invention, an optical burst is a basic switching unit carrying service data at an optical layer, each optical burst is separated by a period of non-optical guard time, and because all optical bursts have equal lengths in terms of time, a period of time occupied by each optical burst and a guard time of the optical burst is referred to as an electrical timeslot (at an electrical layer) or an optical timeslot (at an optical layer). That is, the optical burst is an entity carried on the optical timeslot and has a one-to-one correspondence with the optical timeslot. A time length of each frame is referred to as a frame period, and each frame is formed by the same number of a plurality of optical bursts. An optical burst channel is a set of one or more optical bursts or optical timeslots. Because an optical burst transport unit is an equivalent of a corresponding optical burst channel at the electrical layer, one optical burst transport unit is also a set of one or more timeslots. FIG. 2 is a schematic structural diagram of an optical burst transport unit of which each frame includes three optical bursts. An optical burst channel 1 is a set of one optical timeslot of optical burst, and an optical burst channel 2 is a set of two optical timeslots of optical bursts. It should be noted that in such a case in which a frame structure exists and each timeslot appears repeatedly in each frame, the "timeslot" herein indicates a set formed by timeslots at a same location in each frame.

Figure 3:
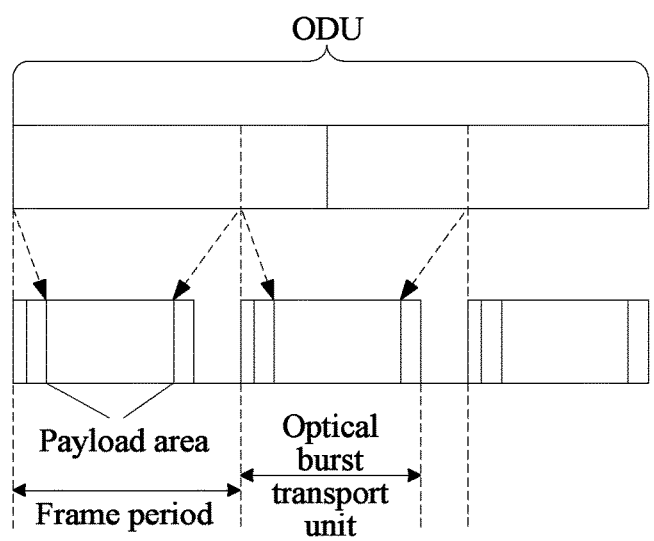
FIG. 3 is a schematic diagram of an embodiment of filling an optical burst transport unit with an ODU according to the present invention.

In an application scenario, the data transmitting processing apparatus may obtain an ODU whose signal time length is equal to a frame period of an optical burst transport unit (which is also a frame period of an optical burst transport channel) and map the ODU to a payload area of the optical burst transport unit. For a mapping manner thereof, refer to FIG. 3. For example, that an ODU (that is, ODU0) whose rate level is 1.25 giga (that is, G) is mapped to an optical burst transport unit whose rate level is 10 G is used as an example. First, the "rate level" is described. The rate level refers to a rate level well known in this industry such as 1.25 G, 2.5 G, 10 G, 40 G or 100 G. However, the rate level is not necessarily strictly limited to these rates but may be slightly different from these rates. For example, both 10.7 Gigabits per second (Gb/s) and 9.953 Gigabits per second (Gb/s) belong to the rate level of 10 G. Assuming that a bit rate of an ODU0 whose rate level is 1.25 G is 1.24416 Gb/s, a signal time length of each ODU0 is approximately 98.354 microseconds (that is, µs). In a case in which a particular guard time is selected, a bit rate of an optical burst transport unit whose rate level is 10 G is approximately 10.882 Gb/s. Assuming that a frame period of the optical burst transport unit is selected to be equal to the signal time length of the ODU0, and each frame of the optical burst transport unit includes eight optical burst transport units, a manner of mapping the ODU0 to this type of optical burst transport unit may be as follows: mapping the ODU0 to a payload area of the optical burst transport unit by using a generic mapping procedure (GMP, Generic Mapping Procedure) or other mapping manners (such as an asynchronous mapping procedure (AMP, Asynchronous Mapping Procedure) and a bit-synchronous mapping procedure (BMP, Bit-synchronous Mapping Procedure)). A specific implementation method may be: reading the ODU0 of 1.24416 Gb/s into a cache; then reading out the ODU0 at the bit rate of the OBTU; and placing the ODU0 in a location of the payload area in a buffer area of the optical burst transport unit. It should be noted that besides data bytes of the ODU0, the payload area may also include a small number of overhead bytes of the optical burst transport unit. For a specific overhead, reference may be made to an overhead of the OTU or an overhead in other network mapping manners, and details are not described herein. In an actual application, in order that the optical burst transport unit can normally read the ODU, a bit rate used for mapping the ODU should not be greater than a bit rate of the optical burst transport unit (that is, a rate level of the ODU is not higher than a rate level of the optical burst transport unit). In the foregoing example, the selected frame period of the optical burst transport unit is exactly equal to the signal time length of one ODU0, and data bytes of one ODU0 can be exactly mapped to one optical burst transport unit. In an actual application, selection of the frame period of the optical burst transport unit may also be unrelated to the signal time length of one ODU0. For example, the frame period of one optical burst transport unit may be less than the signal time length of one ODU. In this case, it is only required that an ODU whose signal time length is equal to the frame period of one optical burst transport unit is selected for mapping, as shown in FIG. 3. In an actual application, a case in which the number of data bytes of the ODU that needs to be selected is not an integer may occur. In this case, a byte filling technology may be used to ensure a correct relationship among the signal time length, the bit rate, and the number of bytes, and details are not described herein.

Further, in this embodiment of the present invention, the data transmitting processing apparatus may also calculate bit data for forward error correction (FEC, Forward Error Correction) coding according to signal data of the ODU and place the bit data in a location for the FEC in the buffer area of the optical burst transport unit.

In another application scenario, the data transmitting processing apparatus may also add overhead bits and FEC bits to the ODU with reference to standards or recommendations such as the International Telecommunication Union-Telecommunication Standardization Sector (ITU-T, International Telecommunication Union-Telecommunication Standardization Sector) G.709, map the ODU to an OTU that has a same rate level as that of the ODU, then select, from the OTU, an ODU whose signal time length is equal to the frame period of one optical burst transport unit, and map the ODU to the payload area of the optical burst transport unit.

Further, in this embodiment of the present invention, the data transmitting processing apparatus may also add a preamble (that is, a preamble) and a guard time to the optical burst transport unit, where the preamble is used for assisting in performing one or more of functions such as synchronization, frequency locking, phase locking, clock recovery, and power locking, and the guard time is used for separating each optical burst, so as to perform cross-connection and burst receiving on the optical burst or optical timeslot when electrical-optical conversion is performed on the optical burst transport unit.

104: Perform electrical-optical conversion on the optical burst transport unit to form an optical burst transport unit.

The data transmitting processing apparatus performs electrical-optical conversion on the optical burst transport unit that carries the ODU to obtain the optical burst transport unit.

105: Carry the optical burst transport unit onto an optical timeslot of an optical burst channel.

An optical burst channel is formed by an optical transmitter by performing electrical-optical conversion on an optical burst transport unit. One optical burst channel corresponds to one optical burst transport unit. The optical burst channel and the optical burst transport unit include same signal data, but the optical burst transport unit is transmitted at the electrical layer and the optical burst channel is transmitted at the optical layer. Because the optical burst channel is formed by performing electrical-optical conversion on the optical burst transport unit, a rate level of the optical burst channel is a rate level of the optical burst transport unit, the number of optical timeslots occupied by the optical burst channel is same as the number of electrical timeslots occupied by the optical burst transport unit, and the electrical timeslot and the optical timeslot have same time lengths.

106: Transmit the optical burst channel to a line.

In an application scenario, the data transmitting processing apparatus performs optical burst timeslot multiplexing or optical burst add/drop multiplexing on the optical burst channel and optical burst channels mapped from other ODUs to form an optical burst multiplex section. Certainly, the data transmitting processing apparatus may also multiplex a plurality of optical burst channels and one optical burst multiplex section into one optical burst multiplex section. The optical burst timeslot multiplexing may be implemented by using an M:1 optical combiner or a fast optical switch; and the optical burst add/drop multiplexing may be implemented by using a 2×2 fast optical switch. When the 2×2 fast optical switch is in a straight-through state, an optical timeslot on a line passes straight through the 2×2 fast optical switch, and add/drop multiplexing does not occur at this time; and when the 2×2 fast optical switch is in a cross-connection state, the optical timeslot on the line is dropped (that is, drop) to the local data transmitting processing apparatus, and the data transmitting processing apparatus may also add (that is, add) an optical timeslot to the line. Certainly, the optical burst add/drop multiplexing may also be implemented by using a 1×1 fast optical switch. First, several optical bursts on the line pass through a splitter, a part of optical power is tapped off to the local data transmitting processing apparatus and passes through a 1×1 fast optical switch to drop optical timeslots to be dropped to this local data transmitting processing apparatus; another part of optical power passes through another 1×1 fast optical switch on the line and remove optical bursts on optical timeslots already dropped to the local data transmitting processing apparatus, to vacate the optical timeslots. The local data transmitting processing apparatus may use the vacated optical timeslots to perform add multiplexing on an optical burst in the optical burst channel by using an optical combiner. Both the optical burst timeslot multiplexing and the optical burst add/drop multiplexing are performed at the optical layer.

In another application scenario, the data transmitting processing apparatus may also perform cross-connection on the optical burst channel and optical burst channels mapped from other ODUs, where the cross-connection is performed on the optical layer. The cross-connection may be implemented by using a fast optical switching array, where a fast optical switching array may be formed by an N×N fast optical switch. Each input port of the fast optical switching array may be a wavelength signal, that is, a signal multiplexed by a plurality of optical burst channels. The signal may be frame-aligned with signals at other input ports by using an adjustable optical delay line of the input port, so as to perform timeslot cross-connection. The N×N fast optical switch switches same optical timeslots at input ports and quickly reconfigures each optical timeslot, thereby implementing cross-connection of the optical burst channel. Certainly, the cross-connection may also be implemented by other switching devices, which is not limited herein.

In this embodiment of the present invention, several optical timeslots of a wavelength are divided into one frame, and there are at least two manners for such dividing.

Figure 4:
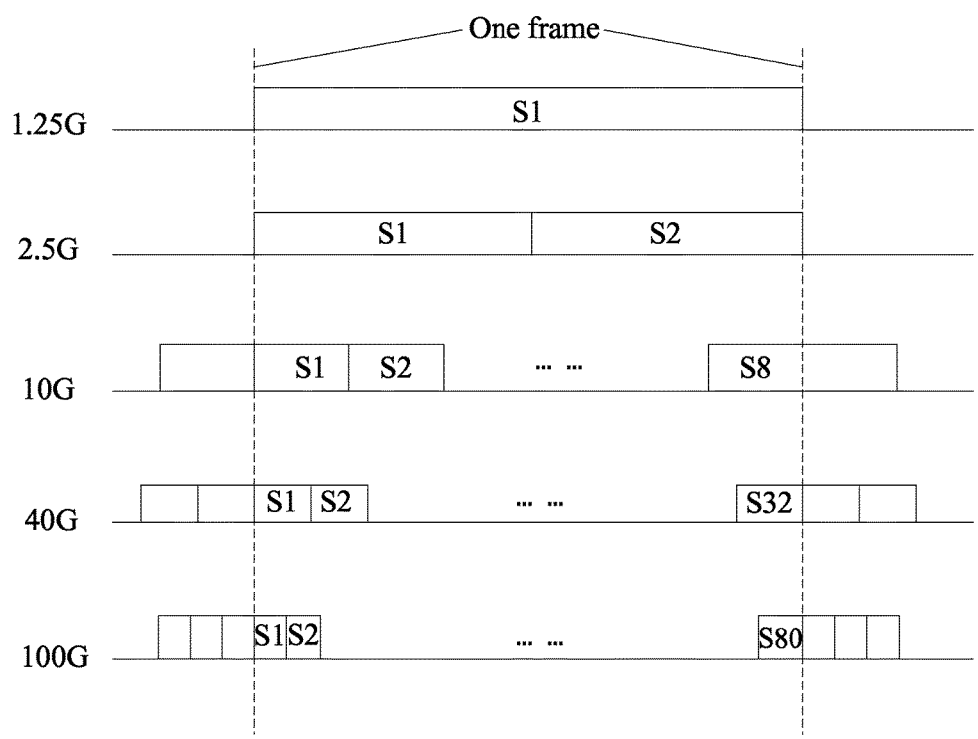
FIG. 4 is a schematic diagram of an embodiment of an optical timeslot division manner according to the present invention.

First division manner: On a network, a frame length (which refers to a time length of a frame) is fixed. For optical burst channels at different rate levels, different numbers of optical timeslots are divided for each frame, so that bandwidth granularities of all optical timeslots are consistent. As shown in FIG. 4, for an optical burst channel whose rate level is 1.25 G, each frame has only one optical timeslot (such as S1); for an optical burst channel whose rate level is 2.5 G, each frame has two optical timeslots (such as S1 and S2); the rest can be deduced by analogy; and for an optical burst channel whose rate level is 100 G each frame has eighty optical timeslots (such as S1 to S80). That is, for the optical burst channels at different rate levels, the optical timeslots are all divided at a bandwidth granularity of 1.25 G, that is, a bandwidth of the ODU0. Obviously, by using this optical timeslot division method, even for optical burst channels at different rate levels, multiplexing and cross-connection can be supported when the smallest granularity is the ODU0.

Second division manner: On a network, a frame period is fixed. For optical burst channels at different rate levels, the same number of optical timeslots are divided for each frame. Therefore, in this manner, for optical burst channels at different rate levels, the optical timeslots are divided at different bandwidth granularities are. Table 2 is a table that shows a bandwidth granularity of each optical timeslot on optical burst channels at different rate levels when 80 optical timeslots form one frame. As can be seen from table 2, for an optical burst channel whose rate level is 100 G, a bandwidth granularity of each optical timeslot is a bandwidth granularity of one ODU0.

TABLE 2

| Rate level | Bandwidth granularity of each optical timeslot |
|---|---|
| 10 G | 125 Mb/s |
| 40 G | 500 Mb/s |
| 100 G | 1.25 Gb/s |
| 400 G | 5 Gb/s |

The foregoing describes two manners about optical timeslot division in this embodiment of the present invention. In an actual application, other division manners may also be adopted, which is not limited herein.

As can be learned from the foregoing, the embodiment of the present invention provides that an ODU is mapped to an optical burst transport unit, and is mapped to an optical timeslot and an optical burst channel level by level, thereby making an optical burst timeslot switching network and a mature OTN network architecture compatible and unified. On the optical burst timeslot switching network, an optical signal is switched in an all-optical manner, that is, multiplexing and cross-connection processes of an optical burst channel are implemented at an optical layer, and therefore, multiplexing and cross-connection of the ODU can also be implemented at the optical layer, which saves a great deal of optical-electrical conversion, electrical-optical conversion, and electrical processing during a data transmission process. On one hand, a data processing process is simplified. On the other hand, a data processing delay is effectively reduced.

Figure 5:
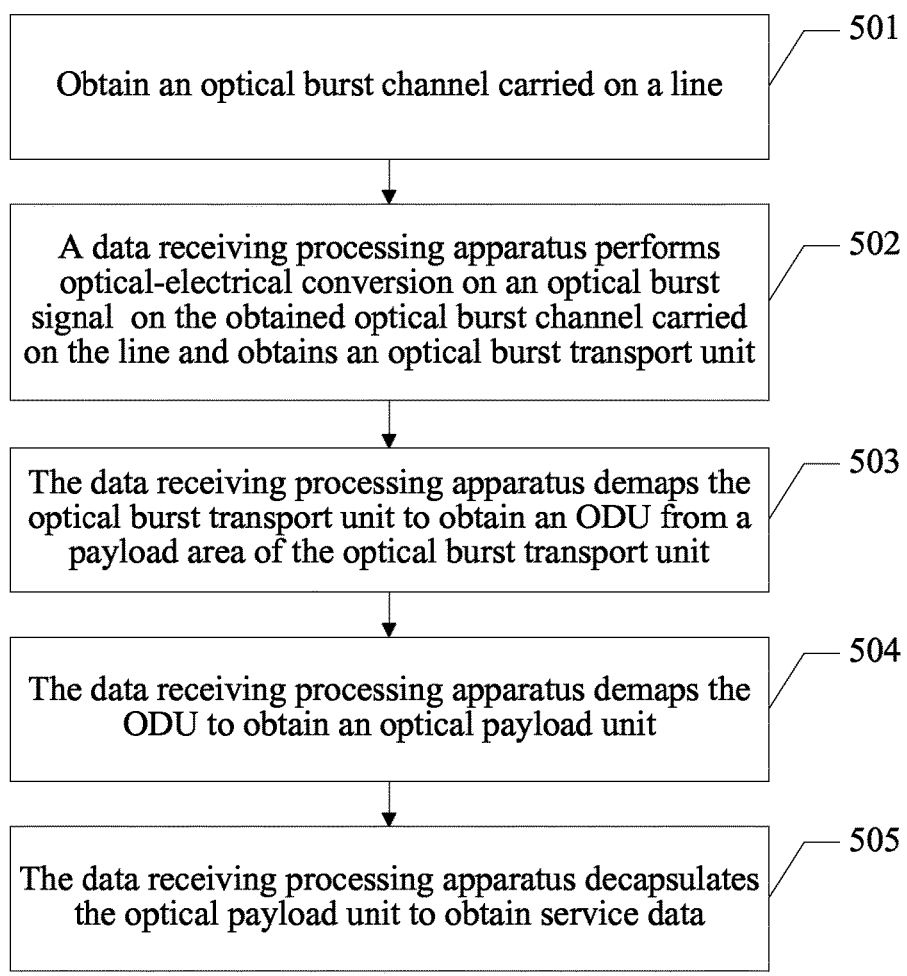
FIG. 5 is a schematic flowchart of another embodiment of a data processing method for an optical transport network according to the present invention.

The following describes a data processing method for an optical transport network in an embodiment of the present invention. Referring to FIG. 5, the data processing method for the optical transport network in the embodiment of the present invention includes:

501: Obtain an optical burst channel carried on a line.

A data receiving processing apparatus receives the optical burst channel from the line.

In an application scenario, if the optical burst channel carried on the line is an optical burst channel transmitted in a multiplexing manner, that is, an optical burst multiplex section, the data receiving processing apparatus performs demultiplexing on the optical burst multiplex section on the line to obtain more than two optical burst channels. The demultiplexing may be implemented by using a 1:M fast optical switch, where the adopted fast optical switch corresponds to a fast optical switch adopted during multiplexing. That is, if a 2:1 fast optical switch is adopted during multiplexing, a 1:2 fast optical switch is adopted for demultiplexing.

502: The data receiving processing apparatus performs optical-electrical conversion on an optical burst transport unit on the obtained optical burst channel to obtain an optical burst transport unit.

In this embodiment of the present invention, an optical burst is a basic switching unit that carries a data signal, each optical burst is separated by a period of non-optical guard time, and because all optical bursts have equal lengths in terms of time, a period of time occupied by each optical burst and a guard time of the optical burst is referred to as an electrical timeslot (at an electrical layer) or an optical timeslot (at an optical layer). A time length of each frame is referred to as a frame period, and all frames are formed by the same number of optical bursts, where the number of the optical bursts may be one or more. An optical burst transport unit is a set of one or more timeslots of optical bursts.

503: The data receiving processing apparatus demaps the optical burst transport unit to obtain an ODU from a payload area of the optical burst transport unit.

504: The data receiving processing apparatus demaps the ODU to obtain an optical payload unit.

505: The data receiving processing apparatus decapsulates the optical payload unit to obtain service data.

The service data may be, for example, Ethernet-type service signal data, Gigabit Ethernet service signal data, 10-Gigabit Ethernet service signal data, a synchronous transfer mode signal (such as STM-8 or STM-16), or the like, which is not limited herein.

As can be learned from the foregoing, the embodiment of the present invention provides that an ODU is mapped to an optical burst transport unit, and is mapped to an optical timeslot and an optical burst channel level by level, thereby making an optical burst timeslot switching network and a mature OTN network architecture compatible and unified. On the optical burst timeslot switching network, an optical signal is switched in an all-optical manner, that is, multiplexing and cross-connection processes of an optical burst channel are implemented at an optical layer, and therefore, multiplexing and cross-connection of the ODU can also be implemented at the optical layer, which saves a great deal of optical-electrical conversion, electrical-optical conversion, and electrical processing during a data transmission process. On one hand, a data processing process is simplified. On the other hand, a data processing delay is effectively reduced.

Figure 6:
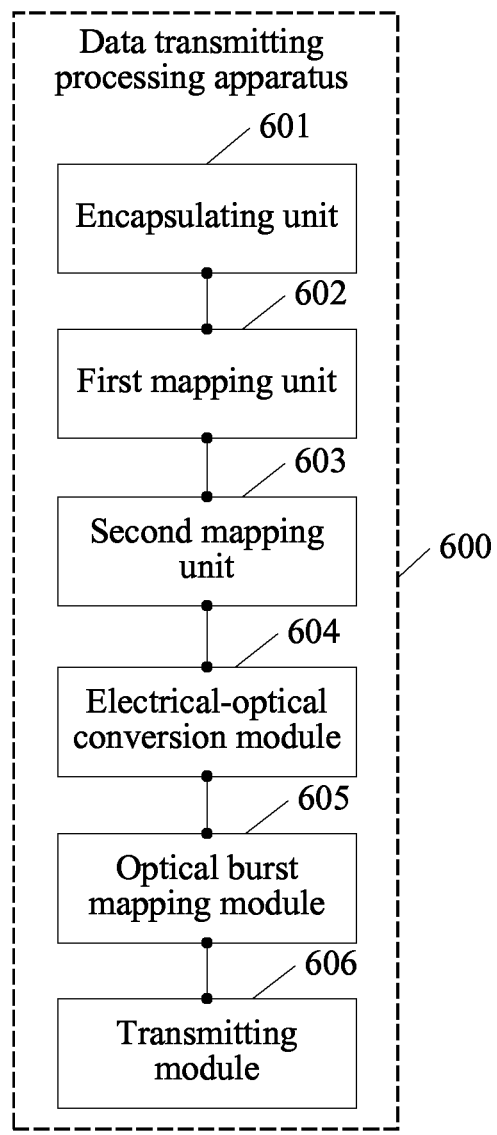
FIG. 6 is a schematic structural diagram of an embodiment of a data transmitting processing apparatus according to the present invention.

The following describes a data transmitting processing apparatus in an embodiment of the present invention. Referring to FIG. 6, the data transmitting processing apparatus 600 in this embodiment of the present invention includes:

An encapsulating unit 601 is configured to encapsulate service data into an optical payload unit.

The service data may be, for example, Ethernet-type service signal data, Gigabit Ethernet service signal data, 10-Gigabit Ethernet service signal data, a synchronous transfer mode signal (such as STM-8 or STM-16), or the like, which is not limited herein;

A first mapping unit 602 is configured to map the optical payload unit to an ODU.

A second mapping unit 603 is configured to map the ODU to a payload area of an optical burst transport unit.

In this embodiment of the present invention, an optical burst is a basic switching unit carrying service data at an optical layer, each optical burst is separated by a period of non-optical guard time, and because all optical bursts have equal lengths in terms of time, a period of time occupied by each optical burst and a guard time of the optical burst is referred to as an electrical timeslot (at an electrical layer) or an optical timeslot (at an optical layer). That is, the optical burst is an entity carried on the optical timeslot and has a one-to-one correspondence with the optical timeslot. A time length of each frame is referred to as a frame period, and each frame is formed by the same number of a plurality of optical bursts. An optical burst channel is a set of one or more optical bursts or optical timeslots. Because an optical burst transport unit is an equivalent of a corresponding optical burst channel at the electrical layer, one optical burst transport unit is also a set of one or more timeslots. FIG. 2 is a schematic structural diagram of an optical burst transport unit of which each frame includes three optical bursts. An optical burst channel 1 is a set of one optical timeslot of optical burst, and an optical burst channel 2 is a set of two optical timeslots of optical bursts. It should be noted that in such a case in which a frame structure exists and each timeslot appears repeatedly in each frame, the "timeslot" herein indicates a set formed by timeslots at a same location in each frame.

In this embodiment of the present invention, the second mapping unit 603 may obtain an ODU whose signal time length is equal to a frame period of an optical burst transport unit and map the ODU to a payload area of the optical burst transport unit. In an actual application, in order that the optical burst transport unit can normally read the ODU, a bit rate used for mapping the ODU should not be greater than a bit rate of the optical burst transport unit (that is, a rate level of the ODU is not higher than a rate level of the optical burst transport unit). In an actual application, selection of the frame period of the optical burst transport unit may also be unrelated to the signal time length of one ODU0. For example, the frame period of one optical burst transport unit may be less than the signal time length of one ODU. In this case, it is only required that an ODU whose signal time length is equal to the frame period of one optical burst transport unit is selected for mapping, as shown in FIG. 3. In an actual application, a case in which the number of data bytes of the ODU that needs to be selected is not an integer may occur. In this case, a byte filling technology may be used to ensure a correct relationship among the signal time length, the bit rate, and the number of bytes, and details are not described herein.

An electrical-optical conversion module 604 is configured to perform electrical-optical conversion on the optical burst transport unit already mapped by the second mapping unit 603 to form an optical burst transport unit.

An optical burst mapping module 605 is configured to carry, the optical burst transport unit obtained by the electrical-optical conversion module 604 by using conversion, onto an optical timeslot of an optical burst channel.

A transmitting module 606 is configured to transmit the optical burst channel processed by the optical burst mapping module 605 to a line.

Further, the transmitting module 606 may further include: a multiplexing module (not shown in FIG. 6), configured to perform optical burst timeslot multiplexing or optical burst add/drop multiplexing on several optical burst channels obtained by the optical burst mapping module 605 by performing processing (that is, a plurality of optical burst channels mapped from different ODU signal data) to form an optical burst multiplex section, where the optical burst timeslot multiplexing or the optical burst add/drop multiplexing is performed at the optical layer.

Further, the transmitting module 606 may further include: a cross-connection module (not shown in FIG. 6), configured to perform cross-connection on several optical burst channels obtained by the optical burst mapping module 605 by performing processing (that is, a plurality of optical burst channels mapped from different ODUs), where the cross-connection is performed at the optical layer.

Further, the data transmitting processing apparatus 600 may further include: a dividing unit, configured to: for optical burst channels at different bit rates, divide each frame into different numbers of optical timeslots, so that all optical timeslots have a same bandwidth granularity; or a dividing unit, configured to: for optical burst channels at different bit rates, divide each frame into the same number of optical timeslots.

It should be noted that the data transmitting processing apparatus 600 in this embodiment of the present invention may be the data transmitting processing apparatus in the foregoing apparatus embodiment. The data transmitting processing apparatus 600 may be configured to implement all the technical solutions in the foregoing apparatus embodiment, and functions of the functional modules of the data transmitting processing apparatus 600 may be specifically implemented according to the method in the foregoing method embodiment. For a specific implementation process thereof, reference may be made to related description in the foregoing embodiment, which is not repeated herein.

As can be learned from the foregoing, the embodiment of the present invention provides that an ODU is mapped to an optical burst transport unit, and is mapped to an optical timeslot and an optical burst channel level by level, thereby making an optical burst timeslot switching network and a mature OTN network architecture compatible and unified. On the optical burst timeslot switching network, an optical signal is switched in an all-optical manner, that is, multiplexing and cross-connection processes of an optical burst channel are implemented at an optical layer, and therefore, multiplexing and cross-connection of the ODU can also be implemented at the optical layer, which saves a great deal of optical-electrical conversion, electrical-optical conversion, and electrical processing during a data transmission process. On one hand, a data processing process is simplified. On the other hand, a data processing delay is effectively reduced.

Figure 7:
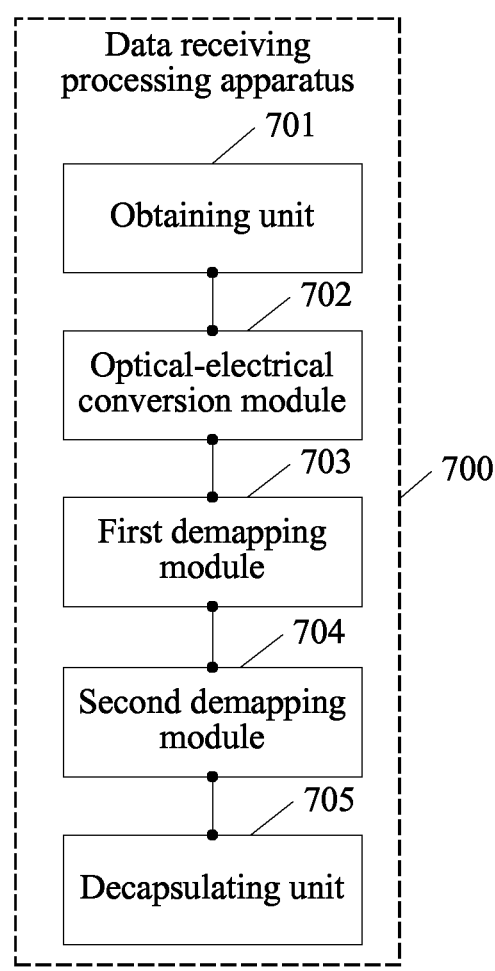
FIG. 7 is a schematic structural diagram of an embodiment of a data receiving processing apparatus according to the present invention.

The following describes a data receiving processing apparatus in an embodiment of the present invention. Referring to FIG. 7, the data receiving processing apparatus 700 in this embodiment of the present invention includes:

an obtaining unit 701, configured to obtain an optical burst channel carried on a line;

an optical-electrical conversion module 702, configured to perform optical-electrical conversion on an optical burst transport unit on the optical burst channel obtained by the obtaining unit 701 to obtain an optical burst transport unit;

a first demapping module 703, configured to demap the optical burst transport unit obtained by the optical-electrical conversion module 702 by performing processing to obtain an ODU from a payload area of the optical burst transport unit;

a second demapping module 704, configured to demap the ODU obtained by the first demapping module 703 by performing processing to obtain an optical payload unit; and a decapsulating unit 705, configured to decapsulate the optical payload unit obtained by the second demapping module 704 by performing processing to obtain service data.

In an application scenario, if the optical burst channel carried on the line is an optical burst channel transmitted in a multiplexing manner, that is, an optical burst multiplex section, the obtaining unit 701 further includes a demultiplexing unit, configured to perform demultiplexing on the optical burst multiplex section on the line to obtain more than two optical burst channels. The demultiplexing may be implemented by using a 1:M fast optical switch, where the adopted fast optical switch corresponds to a fast optical switch adopted during multiplexing. That is, if a 2:1 fast optical switch is adopted during multiplexing, a 1:2 fast optical switch is adopted for demultiplexing.

It should be noted that the data receiving processing apparatus 700 in this embodiment of the present invention may be the data receiving processing apparatus in the foregoing apparatus embodiment. The data receiving processing apparatus 700 may be configured to implement all the technical solutions in the foregoing apparatus embodiment, and functions of the functional modules of the data receiving processing apparatus 700 may be specifically implemented according to the method in the foregoing method embodiment. For a specific implementation process thereof, reference may be made to related description in the foregoing embodiment, which is not repeated herein.

As can be learned from the foregoing, the embodiment of the present invention provides that an ODU is mapped to an optical burst transport unit, and is mapped to an optical timeslot and an optical burst channel level by level, thereby making an optical burst timeslot switching network and a mature OTN network architecture compatible and unified. On the optical burst timeslot switching network, an optical signal is switched in an all-optical manner, that is, multiplexing and cross-connection processes of an optical burst channel are implemented at an optical layer, and therefore, multiplexing and cross-connection of the ODU can also be implemented at the optical layer, which saves a great deal of optical-electrical conversion, electrical-optical conversion, and electrical processing during a data transmission process.

On one hand, a data processing process is simplified. On the other hand, a data processing delay is effectively reduced.

The following describes an optical transport network system in an embodiment of the present invention. The optical transport network system in this embodiment of the present invention includes:

a data transmitting processing apparatus and a data receiving processing apparatus, where the data transmitting processing apparatus is configured to: encapsulate service data into an optical payload unit; map the optical payload unit to an optical channel data unit; map the optical channel data unit to a payload area of an optical burst transport unit; perform electrical-optical conversion on the optical burst transport unit to form an optical burst transport unit; carry the optical burst transport unit onto an optical timeslot of an optical burst channel; and transmit the optical burst channel to a line; and the data receiving processing apparatus is configured to: obtain an optical burst channel carried on a line; perform optical-electrical conversion on an optical burst transport unit on the optical burst channel and obtain an optical burst transport unit; demap the optical burst transport unit to obtain an optical channel data unit from a payload area of the optical burst transport unit; demap the optical channel data unit to obtain an optical payload unit; and decapsulate the optical payload unit to obtain service data.

In this embodiment of the present invention, the data transmitting processing apparatus may obtain an ODU whose signal time length is equal to a frame period of an optical burst transport unit and map the ODU to a payload area of the optical burst transport unit. Certainly, the signal time length of the ODU mapped to the payload area of the optical burst transport unit may also be greater than or less than the frame period of the optical burst transport unit, which is not limited herein.

It should be noted that the data transmitting processing apparatus in this embodiment of the present invention may be the data transmitting processing apparatus 600 in the foregoing apparatus embodiment, and the data receiving processing apparatus in this embodiment of the present invention may be the data receiving processing apparatus 700 in the foregoing apparatus embodiment. The data transmitting processing apparatus 600 and the data receiving processing apparatus 700 may be configured to implement all the technical solutions in the foregoing apparatus embodiments, and functions of the functional modules of the data transmitting processing apparatus 600 and the data receiving processing apparatus 700 may be specifically implemented according to the methods in the foregoing method embodiments. For a specific implementation process thereof, reference may be made to related description in the foregoing embodiments, which is not repeated herein.

As can be learned from the foregoing, the embodiment of the present invention provides that an ODU is mapped to an optical burst transport unit, and is mapped to an optical timeslot and an optical burst channel level by level, thereby making an optical burst timeslot switching network and a mature OTN network architecture compatible and unified. On the optical burst timeslot switching network, an optical signal is switched in an all-optical manner, that is, multiplexing and cross-connection processes of an optical burst channel are implemented at an optical layer, and therefore, multiplexing and cross-connection of the ODU can also be implemented at the optical layer, which saves a great deal of optical-electrical conversion, electrical-optical conversion, and electrical processing during a data transmission process. On one hand, a data processing process is simplified. On the other hand, a data processing delay is effectively reduced.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing introduces in detail the data processing method, related device, and system for the optical transport network provided by the present invention. For a person of ordinary skill in the art, variations may be made to the present invention in terms of specific implementation manners and application scopes according to the ideas of the embodiments of the present invention. Therefore, this specification shall not be construed as limitations to the present invention.

What is claimed is:

1. A service data processing method for an optical transport network, comprising:

encapsulating service data into an optical payload unit;

mapping the optical payload unit to an optical channel data unit;

mapping the optical channel data unit to a payload area of an optical burst transport unit;

performing electrical-optical conversion on the optical burst transport unit to form an optical burst;

carrying the optical burst onto an optical timeslot of an optical burst channel, a number of electrical timeslots occupied by the optical burst transport unit being equal to the number of optical timeslots occupied by the optical burst channel; and transmitting the optical burst channel to a line, including performing optical burst timeslot multiplexing or optical burst add/drop multiplexing on the optical burst channel and optical burst channels mapped from other optical channel data units, to form an optical burst multiplex section, wherein the optical burst timeslot multiplexing or the optical burst add/drop multiplexing is performed at the optical layer, the electrical timeslots and the optical timeslots respectively corresponding to an electrical layer and an optical layer, and each electrical timeslot having a same time length as each optical timeslot.

2. The method according to claim 1, wherein the mapping the optical channel data unit to the payload area of the optical burst transport unit is specifically:

mapping the optical channel data unit, whose signal time length is less than or equal to a frame period of the optical burst transport unit, to the payload area of the optical burst transport unit.

3. The data processing method according to claim 1, wherein the optical burst transport unit further carries a preamble and a guard time.

4. The data processing method according to claim 1, wherein the transmitting the optical burst channel to the line comprises:

performing cross-connection on the optical burst channel and optical burst channels mapped from other optical channel data units, wherein the cross-connection is performed at the optical layer.

5. The data processing method according to claim 1, wherein a bit rate corresponding to the optical channel data unit is not greater than the bit rate of the optical burst transport unit.

6. The data processing method according to claim 1, wherein before the carrying the optical burst onto the optical timeslot of the optical burst channel, the data processing method comprises:

for optical burst channels at different bit rates, dividing each frame into different numbers of optical timeslots, so that all optical timeslots have a same bandwidth granularity.

7. The data processing method according to claim 1, wherein before the carrying the optical burst onto the optical timeslot of the optical burst channel, the data processing method comprises:

for optical burst channels at different bit rates, dividing each frame into the same number of optical timeslots.

* * * * *